Patented Oct. 25, 1932

1,884,274

UNITED STATES PATENT OFFICE

HÅKAN SANDQVIST AND THORSTEN OLOF HJALMARSSON LINDSTRÖM, OF STOCKHOLM, SWEDEN

PROCESS OF PREPARING LYO-PHILE PRODUCTS OF FATTY SUBSTANCES OF ANY ORIGIN

No Drawing. Application filed February 27, 1929, Serial No. 343,238, and in Sweden March 16, 1928.

It is known that it is possible to obtain a salve base (known under the registered trade names as Vanoline, Eucerine and others), which is not only hydrophile but also lyophile, i. e., capable of absorbing considerable quantities of water and water solutions or other liquids (which is of great pharmaceutical importance), by adding small quantities of oxycholesterol (which is an animal product isolated from wool fat) to petroleum jelly, paraffin or the like. Oleic acid has also been proposed for the same purpose.

We have now examined the possibility of obtaining the same effect by phytosterols alone, which are substances of alcoholic nature consisting of carbon, hydrogen and oxygen, and occurring in plants. It has been shown that these are excellent emulsifiers by themselves for preparing constant and highly concentrated emulsions of the type water/oil, where the water, consequently, is the disperse phase and the oil the external phase.

This invention relates to a process of preparing lyophile products from fatty substances of any origin by adding a small quantity, suitable from about 0.1 to 10 per cent by weight, of one or more phytosterols to the fatty substances. The phytosterol may, before being added to the fatty substances, be subjected to a certain oxidation influence. It has proved suitable to make the addition of the phytosterol during heating of the fatty substance to a suitable temperature. At the same time air may be passed through the liquified mixture in order to effect certain oxidation or transformation processes of the phytosterol. The invention also consists in products prepared according to this process.

We have especially tried the process on mineral oil products such as petroleum jelly, paraffin, lubricating oils and the like, and we have found that an addition of 3 per cent phytosterol or oxidized phytosterols to these substances renders them able to absorb 2 to 3 times their own weight of water, or more or less concentrated water solution of the most varied substances such as glycerine, subacetate of aluminium, nitrate of silver, iodine, etc. With an addition of 5 per cent phytosterol to petroleum jelly we have succeeded in obtaining a lasting salve with water 4 times exceeding the weight of the petroleum jelly. Also glycerine alone may be worked in to about the same quantity as water. Other suitable substances may also be worked in, for instance aqueous alcohol.

Even fatty oils may, by an addition of phytosterol be made to absorb (i. e. emulsify therein) a large quantity of water.

It is clear that this is not only of importance for preparing medical and cosmetic salves, but also for other cases when a lasting water/oil emulsion is required, for instance for certain lubricants, certain paints, in the food industry for instance production of margarine or for other purposes.

In the following, three specific examples are given for carrying out our invention for preparation of a salve foundation and a lubricating oil.

*Example 1*

Two parts by weight of phytosterol and 98 parts by weight of petroleum jelly are heated up to 180 to 200° C., and are kept for half an hour at this temperature during frequent stirring or while air is bubbled through. The cooled composition forms a good salve foundation for pharmaceutical and cosmetic purposes.

*Example 2*

One part by weight of phytosterol and 99 parts by weight of mineral lubricating oil are treated in the same manner as stated above in Example 1. In this case one obtains an excellent marine (or compound) oil.

*Example 3*

One part by weight of phytosterol and 3 parts by weight of fatty oil are mixed and heated, but not sufficiently to injure the oil. To the product thus obtained other oily material is added and well mixed. One thus obtains a lyophile emulsion.

As an alternative procedure, the phytosterol may be first oxidized by aeration at 180° to 200° C., and then added to the oily material.

We claim:

1. Process of preparing lyophile products from oleaginous substances, consisting in adding a small quantity of an oxidized phytosterol to said oleaginous substances.

2. Process of preparing lyophile products from oleaginous substances, consisting in adding from about 0.1% up to 10% of an oxidized phytosterol preferably from about 0.1 to 10 per cent by weight to said oleaginous substances.

3. Process of preparing lyophile products from oleaginous substances, consisting in heating the oleaginous substances and adding a small quantity of oxidized phytosterol to said oleaginous substances.

4. Process of preparing lyophile products from oleaginous substances, consisting in heating the oleaginous substances and adding from about 0.1% up to 10% of an oxidized phytosterols preferably from about 0.1 to 10 per cent by weight to said oleaginous substances.

5. Process of preparing lyophile products from oleaginous substances, consisting in heating the oleaginous substances, adding from about 0.1% up to 10% of at least one phytosterol to said oleaginous substances and passing air through the liquefied warm mixture.

6. Process of preparing lyophile products from oleaginous substances, consisting in heating the oleaginous substances, adding at least 1% of phytosterol to said oleaginous substances and passing air through the liquefied warm mixture.

7. As a new composition of matter petroleum jelly containing several per cent of a phytosterol.

8. As a new composition of matter petroleum jelly containing several per cent of an oxidized phytosterol.

9. As a new composition of matter petroleum jelly containing several per cent of a phytosterol and an aqueous medicament emulsified therein.

In witness, whereof, we have hereunto signed our names.

HÅKAN SANDQVIST.
THORSTEN OLOF HJALMARSSON LINDSTRÖM.